United States Patent [19]
Sekino

[11] Patent Number: 6,010,323
[45] Date of Patent: Jan. 4, 2000

[54] VACUUM PRESSURE FORMING APPARATUS AND VACUUM PRESSURE FORMING METHOD

[75] Inventor: Michio Sekino, Oomiya, Japan

[73] Assignee: Masaki Ooba, Aomori, Japan

[21] Appl. No.: 08/843,063

[22] Filed: Apr. 11, 1997

[51] Int. Cl.[7] .......................... B29C 43/22; B29C 43/44; B29C 43/52

[52] U.S. Cl. ................... 425/122; 425/125; 425/364 R; 425/384; 425/387.1; 425/818

[58] Field of Search ................... 425/384, 387.1, 425/388, 340, 818, 364 R, 383, 122, 125, 385; 264/555, 571, 280, 284, 286, 293, 504, 500

[56] References Cited

U.S. PATENT DOCUMENTS

| | | | |
|---|---|---|---|
| 2,551,005 | 5/1951 | Johnson | 264/284 |
| 2,896,387 | 7/1959 | Brock | 425/388 |
| 3,072,961 | 1/1963 | Gilbert | 425/388 |
| 3,593,492 | 7/1971 | Frankefort . | |
| 3,632,252 | 1/1972 | Amberg et al. . | |
| 3,895,087 | 7/1975 | Ottinger et al. | 425/388 |
| 4,226,828 | 10/1980 | Hall | 264/504 |
| 4,666,394 | 5/1987 | Wakamiya et al. | 425/384 |
| 4,740,342 | 4/1988 | Menard et al. | 425/388 |
| 5,314,325 | 5/1994 | Bosler . | |
| 5,636,501 | 6/1997 | Long et al. . | |

FOREIGN PATENT DOCUMENTS

| | | | |
|---|---|---|---|
| 2-229255 | 9/1990 | Japan | 264/284 |
| 4-70322 | 3/1992 | Japan . | |
| 6-134852 | 5/1994 | Japan . | |

*Primary Examiner*—Jay H. Woo
*Assistant Examiner*—Robert Hopkins
*Attorney, Agent, or Firm*—Wenderoth, Lind & Ponack, L.L.P.

[57] ABSTRACT

A vacuum pressure forming apparatus which is capable of uniformly heating a sheet member and preventing the occurrence of wrinkles or rain drops in the sheet member. The apparatus is equipped with an endless belt having a number of air holes and is stretched between a heating drum and a cooling drum. After preheating, the sheet member is placed closely into contact with a surface of the endless belt through the use of a pressing roller and the sheet member is clamped between the endless belt and a metal pattern having a plurality of cavities formed therein. The apparatus further includes a pressure difference producing device which supplies pressurized air from a rear surface side of the endless belt toward the sheet member such that pressure on an upper surface of the sheet member becomes higher than pressure on a lower surface thereof. Consequently, the sheet member is formed into configurations corresponding to the configurations of the cavities of the metal pattern.

11 Claims, 3 Drawing Sheets

VACUUM PRESSURE FORMING APPARATUS AND VACUUM PRESSURE FORMING METHOD

BACKGROUND OF THE INVENTION

1. Field of the Invention

The present invention relates to a vacuum pressure forming apparatus and vacuum pressure forming method which are available for manufacturing simple containers such as yogurt containers from a thermoplastic resin sheet.

2. Description of the Prior Art

In the so-called known vacuum (pressure) forming techniques, thermoplastic resin sheet member, after being heated by an appropriate heating device and softened, is fixed onto a surface of a metal pattern having a number of small vacuumizing holes so as to brought into a hermetically sealed condition so that no leakage of air occurs between the sheet member and the metal pattern. In this state the air is rapidly discharged from the cavities of the metal pattern through the small vacuumizing holes, with the result that the sheet member is formed into a configuration of the cavities due to the inversion transfer. Accordingly, for producing high-quality formed pieces through the use of such a forming technique, an important point is that the sheet member is previously heated to a uniform temperature. Otherwise, an irregular heating temperature distribution immediately causes production of articles of inferior quality, which include defects such as non-uniformities in wall thickness.

So far, for such a vacuum pressure forming apparatus, an oven type apparatus and a heating plate type apparatus have been known as a means for heating the sheet member. Although in the oven type apparatus both side portions of a formation sheet member in its width direction are clamped and heated by passing through heated air within an oven or the like, and thus the heated sheet member is softened and stretched as the temperature rises, so that its central portion hangs down due to its dead weight. If the sheet is hanging down during the formation by the metal pattern, there is a possibility that wrinkles will appear in the formed pieces.

In addition, in general the oven is constructed to be less than 1 meter in width by less than several meters in length, and in a case of heating by the oven, several tens to more than one hundred casing heaters made from ceramic or metal are vertically separately disposed at a considerable distance (10 to 20 cm) in a state that the sheet member to be formed is interposed therebetween. Each of the heaters is individually made such that its temperature is adjustable. Moreover, the entire heating is proportionally adjustable, and the total capacity of the heaters can be several tens of Kw to above 100 Kw. This is a capacity to the extent that the sheet member to be formed (formation sheet member) is fully carbonized when the total energy is absorbed by the formation sheet member, and from this point of view this apparatus is extremely uneconomical. Besides, because the temperature control is based upon the indirect heating (radiation heat and air heat transfer), adjustment of the temperature is necessary while watching out for the sheet member and the formed pieces, which in turn requires experienced and skilled workmen.

On the other hand, the heating plate type apparatus can provide high thermal efficiency, but is constructed such that a large number of heating elements are placed below the heating plate and controlled individually as in the case of the above-mentioned oven type apparatus. In addition, the heating plate type apparatus works as shown in FIGS. 3A to 3D. That is, after a sheet member 1 is placed on a top surface of a heating plate 2 (see FIG. 3A), a metal pattern 3 is lowered to tightly hold an outer circumferential edge portion of the sheet member 1 in cooperation with the heating plate 2. Subsequently, pressurized air is introduced through small holes 3a made in the metal pattern 3 into the interior of the metal pattern 3 so that the pressurized air presses the sheet member 1 to make it come closely into contact with the surface of the heating plate 2. In this state, the heating plate 2 heats the sheet member 1 (see FIG. 3B). Following this, the small holes 3a are released to the atmosphere (or vacuumed) and pressurized air is introduced through a number of air holes 2a formed in the heating plate 2 so that the sheet member 1 is pressed against cavity surfaces of the metal pattern 3 (see FIG. 3C). Finally, the metal pattern 3 is lifted to remove the pieces formed therein (see FIG. 3D).

In the case of such a heating plate type apparatus, when the sheet member 1 is pressed by air pressure against the surface of the heating plate 2, as shown in FIG. 3B, an air layer stays between the sheet member 1 and the surface of the heating plate 2 so that portion of the sheet member 1 does not come closely into contact with the heating plate 2 surface to cause unsatisfactory heating, which can bring about rain drops.

One possible approach to reduce the occurrence of the rain drops is to Teflon-process or roughly machine the surface of the heating plate in order to facilitate the air discharge and the movement of the sheet member when heated or the temperature of the heating plate is adjusted relative to the percentage of heat contraction of the sheet member.

However, in general the heated sheet member lengthens due to the thermal expansion so as to enlarge its surface area. Also, since in this type of heating plate apparatus, the outer circumferential edge portion of the sheet member is hermetically held between the heating plate and the metal pattern and pressurized air is then introduced into the metal pattern to heat the sheet member. In other words, since in the heating plate type apparatus the sheet member undergoes area enlargement after the fixing, of its circumference, the expansion of the sheet member accordingly produces looseness so that a portion of the sheet member naturally rises to some extent, which destroys the close contact between the sheet member and the heating plate, thereby making it difficult to uniformly heat the sheet member. This problem is unavoidable because of the principle of the heating plate type apparatus in which the circumference of the sheet member is clamped prior to the heating operation.

SUMMARY OF THE INVENTION

The present invention has been developed with a view to eliminating the above-mentioned problems, and it is therefore an object of this invention to provide a vacuum pressure forming apparatus and vacuum pressure forming method which are capable of uniformly heating a sheet member and further capable of completely preventing the occurrence of wrinkles in the sheet member and the occurrence of rain drops so that high-quality formed pieces can be manufactured.

Another object of this invention is to improve the thermal efficiency of the vacuum pressure forming apparatus.

For these purposes, a vacuum pressure forming apparatus according to the present invention features that a sheet member is placed closely into contact with a surface of an endless belt and heated so as to be adhered thereto. Thus, the sheet member is heated through the endless belt.

In accordance with a first aspect of this invention, a vacuum pressure forming apparatus comprises an endless belt having a number of air holes formed therein, belt heating means for heating the endless belt, means for making a sheet member come closely into contact with a surface of the endless belt, a metal pattern operable to contact and separate with and from the endless belt surface, and pressure difference producing means for supplying pressurized air from a rear surface of the endless belt toward the metal pattern and/or discharging air within cavities of the metal pattern to produce a difference in pressure so that a pressure on a belt side surface of the sheet member becomes higher than a pressure on a metal pattern side surface thereof.

In this case, the belt heating means is constructed as a means to heat rollers stretching the endless belt. Further, it is also appropriate that, as the belt heating means, a sheathed heater is located so as to face the endless belt or a roller dedicated to heating is provided and pressed against the endless belt.

Furthermore, in a vacuum pressure forming method according to this invention, in a state where an endless belt having a number of air holes is heated and a sheet member to be formed is placed closely into contact with a surface of the endless belt, a metal pattern is brought closely into contact with a surface of the sheet member opposite to its belt side surface and pressurized air is supplied from a rear surface of the endless belt toward the metal pattern and/or air is discharged from within cavities of the metal pattern to produce a difference in pressure so that a pressure on the belt side surface of the sheet member is higher than a pressure on a metal pattern side surface thereof, with the result that configurations of the cavities are transferred to the sheet member.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

Figure 1:
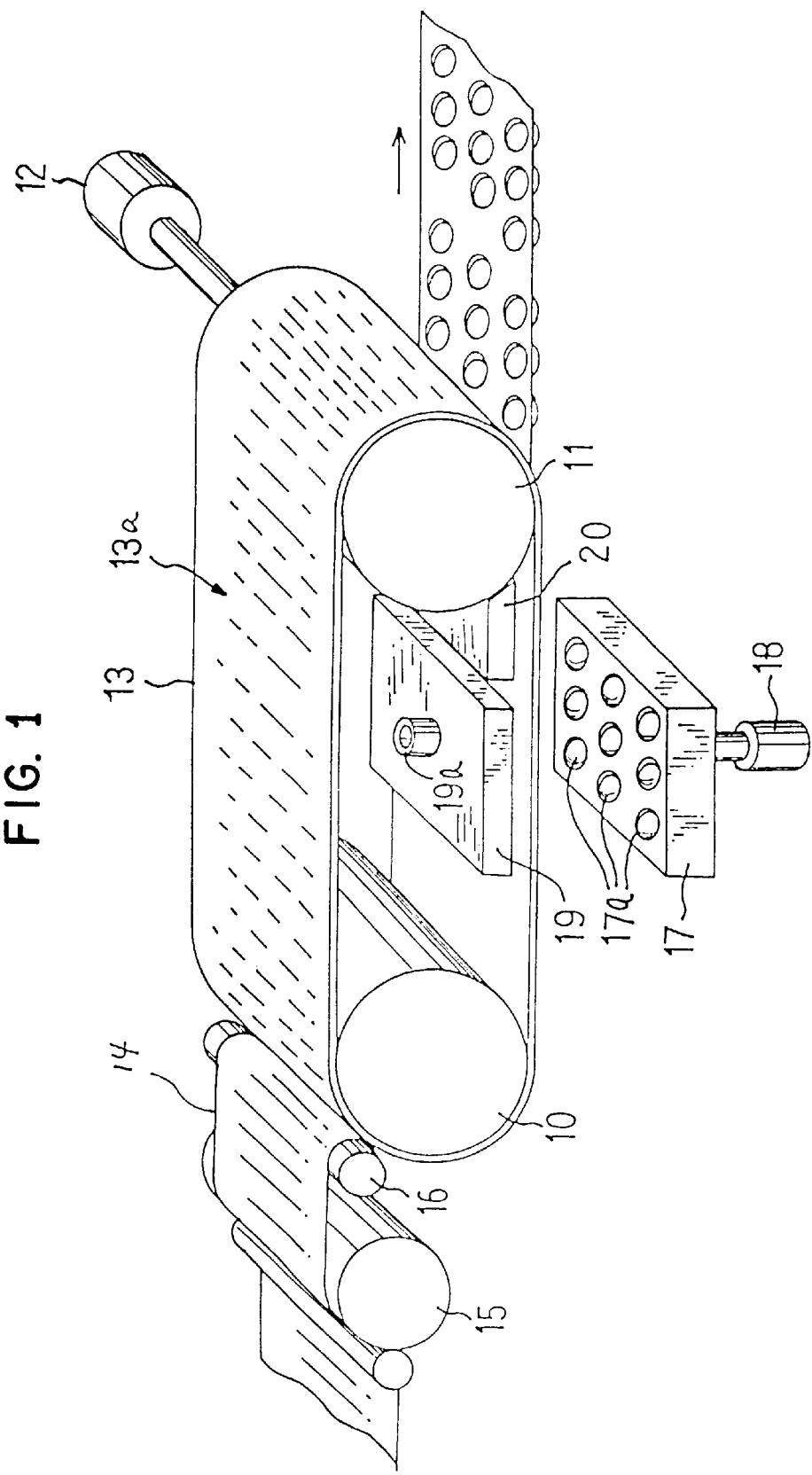
FIG. 1 is a perspective view showing a construction of a vacuum pressure forming apparatus according to an embodiment of the present invention.

Referring now to the drawings, a description will be made hereinbelow of a vacuum pressure forming apparatus according to an embodiment of the present invention. FIG. 1 is a perspective view showing a construction of the vacuum pressure forming, apparatus. In the illustration, designated at numeral 10 is a cylindrical heating drum whose axis takes a horizontal position and which is supported so as to be rotatable about the axis. The cylindrical drum has a hollow configuration in order to allow circulation of a heating medium. The heating medium can be a heating oil, steam, hot pressurized water, and the like. Further, denoted at numeral 11 is a cooling drum having the same configuration and dimensions as the heating drum 10. Also, the cooling drum 11 is disposed in parallel to the heating drum 10. The interior of the cooling drum 11 is made to allow cooling water to circulate. A rotational drive unit comprising an electric motor 12 is attached to a rotatable shaft of the cooling drum 11. More specifically, the cooling drum 11 is rotationally and intermittently driven counterclockwise as will be described later. Although the cooling of an endless belt 13 is achievable by natural radiation, the circulation of cooling water in the cooling drum 11 is more effective in preventing overheating of the endless belt 13 during long-term continuous operation.

Furthermore, depicted at numeral 13 is the above-mentioned endless belt stretched between the heating drum 10 and the cooling drum 11. The endless belt 13 is constructed in such a manner that both end portions of a metallic strip-like member, such as being made of a stainless steel, are joined to each other to form a loop-like configuration. In addition, air holes 13a, each having a diameter of 0.5 mm are formed in the endless belt 13 and are arranged at intervals of 10 mm to wholly form a grating-like configuration. Incidentally, the endless belt 13 can also be made of a polymer material which can withstand the temperatures applied thereto. In this case, in order to prevent the application of an excessive stress to the endless belt 13, preferably the diameter of the heating drum 10 and the cooling drum 11 is set to be approximately 500 to 2000 times the thickness of the endless belt 13. In this embodiment, the belt 13 has a thickness of 1 mm while each of the heating drum 10 and the cooling drum 11 has an outer diameter of 1 m. Further, it is desirable that the separation or interval between the air holes 13a is approximately 5 to 20 mm and the diameter of each of the air holes 13a is approximately 0.2 to 2 mm.

Still further, in this embodiment, the heating temperature of the heating drum 10 comes under heating control so that the surface temperature of the belt 13 reaches 150° C., while the cooling drum 11 undergoes cooling control so that the surface temperature of the belt 13 is reduced to approximately 60° C.

Designated at numeral 14 is a sheet member to be formed (which will be referred hereinafter to as a formation sheet member or sheet member) made from a polystyrene sheet. This formation sheet member 14 is designed to be continuously fed from a supply roll (not shown) situated on the left-hand side in the illustration to advance in the right-hand direction.

The sheet member 14 is preheated by a preheating roller 15 which has a hollow configuration to allow the circulation of a heating medium as well as the above-mentioned heating drum 10, except that its heating temperature is controlled to 70° C. somewhat lower than that of the heating drum 10 so that the sheet member 14 can naturally be peeled off a surface of the preheating roller 15. After being preheated by the preheating roller 15, the sheet member 14 is brought closely into contact with the surface of belt 13 through the use of a pressing roller 16. The pressing roller 16 is formed of a heat-resistant rubber with a moderate elasticity whereby the sheet member 14 can be pressed against the surface of belt 13 with an appropriate biasing force.

Reference numeral 17 denotes a metal pattern (die) made of a metal for the deformation of the sheet member 14. The metal pattern being, at its rear surface, fitted to a hydraulic cylinder unit 18 so as to be movable vertically while its top surface is maintained in a horizontal orientation. In the top surface of the metal pattern 17 there are bored a plurality of female cavities 17a each having an inverted configuration corresponding to a configuration of a desired formed piece. Although in the illustration the cavities 17a are 3×3=9 in number, in fact more cavities may reside therein, for example, 8×8=64. In addition, in the inner wall surface of each of the cavities 17a there are a number of small air vent holes which communicate with the rear surface of the metal pattern 17. In particular, several small holes are provided in edge portions of the cavity 17a.

Furthermore, numeral 19 denotes a pressurized air introduction cover having a configuration like an upside-down rectangular tray. The pressurized air introduction cover 19 is disposed horizontally and in the vicinity of the inner circumferential surface of the endless belt 13 so as to be in an opposed relation to the metal pattern 17 in a state that the endless belt 13 is interposed therebetween. Further, a seal packing (not shown) is attached to the entire lower edge portion of the pressurized air introduction cover 19 which faces the endless belt 13, and inlet 19a is provided in a central portion of the top surface and is connected to an air compressor (not shown) in order to introduce pressurized air.

In addition, a cooling air introduction cover, designated at numeral 20, is disposed in parallel on the right side of the pressurized air introduction cover 19, and an inlet 20a (see FIGS. 2A to 2D) is provided in its upper central portion and is connected to a blower (not shown) in order to introduce cooling air.

Secondly, referring to FIGS. 2A to 2D a description will be made hereinbelow of operations of the vacuum pressure forming apparatus thus constructed in accordance with the embodiment illustrated in FIG. 1. FIGS. 2A to 2D are front elevational views showing successive operations in the vacuum pressure forming apparatus.

Figure 2A:
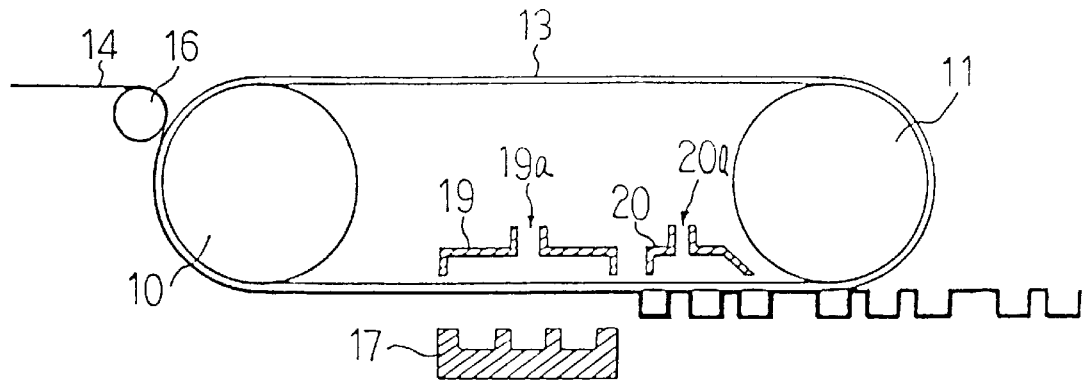
FIGS. 2A to 2D are front elevational views illustrating an operation of the FIG. 1 vacuum pressure forming apparatus.

Now, let it be assumed that the formation sheet member 14 is placed closely into contact with the surface of the endless belt 13 to be adhered thereto as shown in FIG. 2A. In this case, the temperature of the endless belt 13 is 150° C. at a left-hand portion which is in contact with the heating drum 10, 145° C. at a central portion right above the metal pattern 17, and 60° C. at a right-hand portion which is in contact with the cooling drum 11. The sheet member 14 substantially has the same temperatures.

Figure 2B:
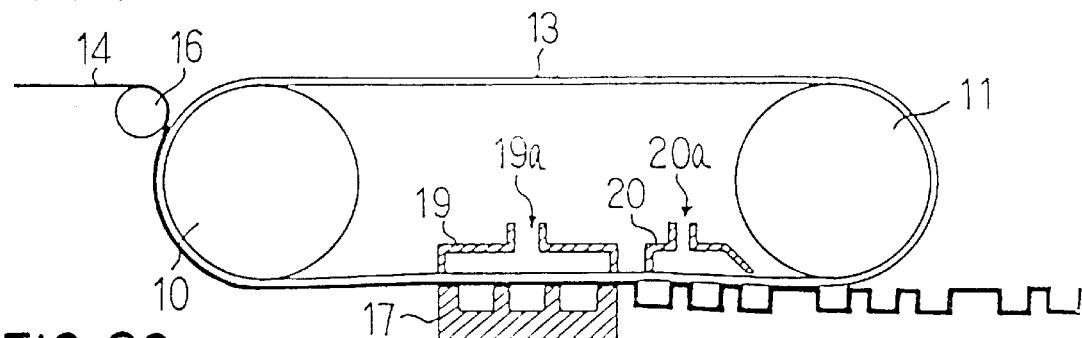

Subsequently, the hydraulic cylinder 18 is driven to lift the metal pattern 17 as shown in FIG. 2B, with the result that the metal pattern 17 pushes the lower surface of the endless belt 13 upwardly so that the sheet member 14 comes into a clamped state between the metal pattern 17 and the endless belt 13. Further, the upper surface of the endless belt 13 brought is closely into contact with the packing at the lower edge portion of the pressurized air introduction cover 19, thus hermetically sealing a portion between the pressurized air introduction cover 19 and the endless belt 13.

Figure 2C:
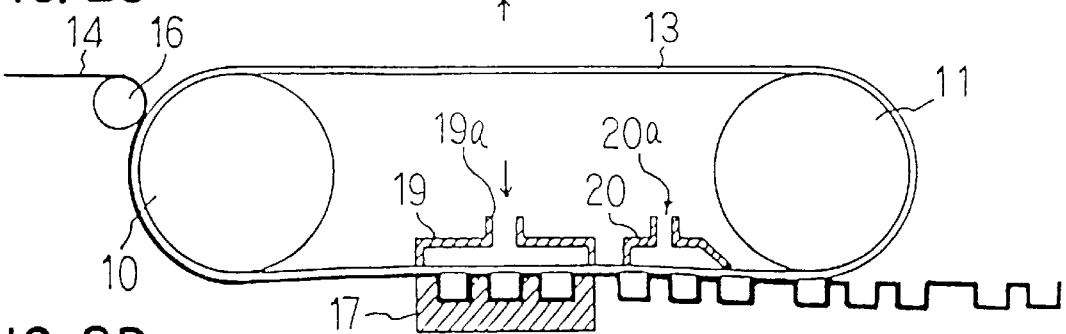

Pressurized air is then introduced through the inlet 19a of the pressurized air introduction cover 19 as shown in FIG. 2C. In this embodiment the pressure of the pressurized air is set at 5 kg/cm². The pressurized air passes through a number of air holes 13a of the endless belt 13 and applies pressure to the top surface of the sheet member 14. Accordingly, the pressure on the belt 13 adhered surface (the upper surface in the illustrations) of the sheet member 14 exceeds the pressure on the metal pattern 17 side surface (the lower surface in the illustration). Due to the pressure difference, the sheet member 14 is partially pressed against the inner wall surfaces (see FIG. 1) of the cavities 17a of the metal pattern 17, with the result that the pressed portions are almost instantaneously expanded to be formed into the configurations due to the inversion transfer of the cavity 17a configuration. Incidentally, it is also appropriate that a vacuum is produced through the air vent holes in the rear surface of the metal pattern 17 at the same time that the pressurized air is introduced toward the top surface of the sheet member 14.

Figure 2D:
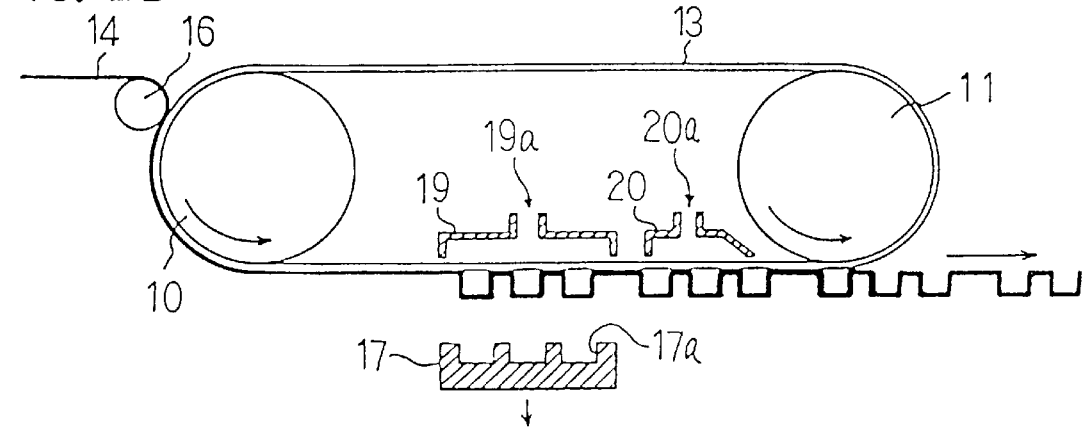
Figure 3A:
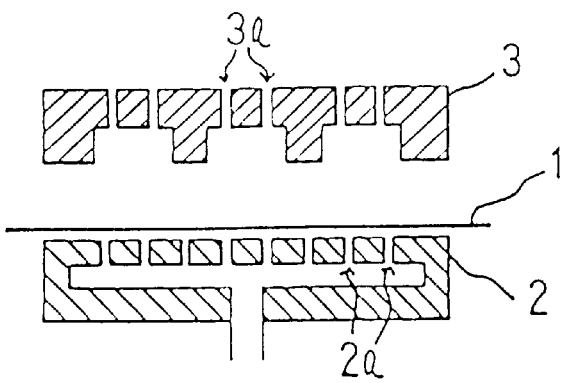
FIGS. 3A to 3D are illustrations of a prior art heating plate type apparatus.
Figure 3B:
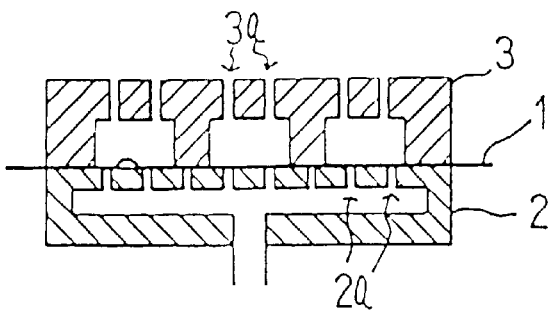
Figure 3C:
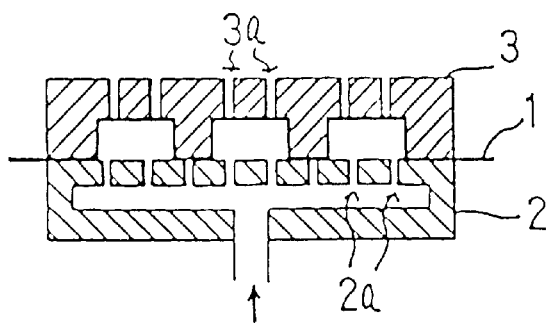
Figure 3D:
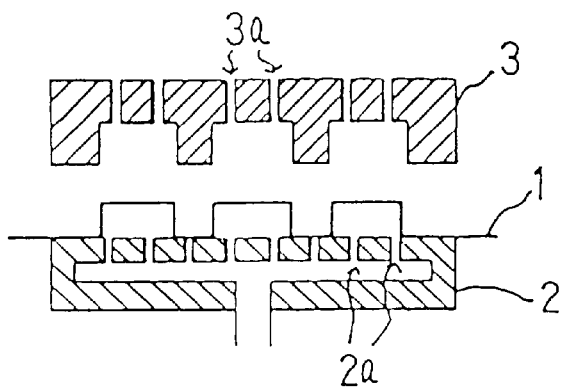

Thereafter, as shown in FIG. 2D the metal pattern 17 is shifted downwardly, so that the sheet member 14 is separated from the cavities 17a, i.e., the metal pattern 17. In this case, it is also possible that pressurized air is introduced from the rear side of the metal pattern 17 into the air vent holes. Following this, the electric motor 12 is rotationally driven in a counterclockwise direction to shift the endless belt 13 by a predetermined distance. Simultaneously, cooling air is supplied into the cooling air introduction cover 20 to immediately cool the formed sheet member 14 in addition to the endless belt 13. The formed sheet member 14 is successively shifted in the right-hand direction to obtain the final articles through an after-process such as trimming.

When the endless belt 13 rotates counterclockwise, the sheet member 14 is continuously fed from the left-hand direction in the illustration. At this time, the sheet member 14 is already preheated by the preheating roller 15 and, hence, is somewhat softened and slightly expanded to be in a lengthened state. In this state, the sheet member 14 is pressed against the surface of the endless belt 13 by means of the pressing roller 16 in order to be brought closely into contact therewith. A portion of the sheet member 14, pressed against the surface of the endless belt 13, is instantaneously heated due to the high temperature of the endless belt 13 to extend. This extension is eliminated by the pressing roller 16 which inhibits the entry of air between the sheet member 14 and the endless belt 13. Accordingly, no looseness or wrinkles will occur in the sheet member 14, and therefore the sheet member 14 can be adhered to the endless belt 13 in a completely contacting condition.

As described above, in the vacuum pressure forming apparatus according to this invention, the sheet member is placed closely into contact with the surface of the heated endless belt so as to be adhered thereto before being heated, and hence no looseness or wrinkles occur in the sheet member. In addition, since the sheet member is adhered to the endless belt and heated in a completely horizontal and closely contacting condition, no gap occurs between the sheet member and the endless belt, thus effecting uniform heating of the sheet member. Consequently, no wrinkles or rain drops appear in the formed pieces, and hence excellent formed pieces are producible. Also, if the surface of the endless belt is mirrorfinished to a degree of 0.2 to 0.4 μm, when the belt surface is transferred onto the sheet member, the appearance of the formed pieces is good.

Furthermore, in the case that a sheet member used previously has letters or figures thereon, since the hanging-down of the sheet member does not arise unlike the prior oven type apparatus, the printed patterns can be aligned with the metal pattern with a high degree of accuracy. Moreover, the vacuum pressure forming, apparatus can sharply enhance the thermal efficiency as compared with the prior oven type and heating plate type apparatus.

It should be understood that the foregoing relates to only a preferred embodiment of the present invention, and that it is intended to cover all changes and modifications of the embodiment of the invention herein used for the purposes of the disclosure, which do not constitute departures front the spirit and scope of the invention.

What is claimed is:

1. A vacuum pressure forming apparatus comprising:
   an endless belt having a plurality of air holes extending between an outer surface of said endless belt and an inner surface of said endless belt;

a heating device for heating said endless belt;

a device for delivering a sheet member into contact with said outer surface of said endless belt;

a metal pattern disposed adjacent to said endless belt and being movable toward and away from said endless belt, said metal pattern having a plurality of cavities formed therein; and a pressurized air supply device disposed adjacent said inner surface of said endless belt at a location opposite said metal pattern, wherein said pressurized air supply device is operable to supply pressurized air to a belt-side surface of the sheet member, via said air holes, so that the pressure on the belt-side surface of the sheet member is greater than the pressure on a metal pattern side surface of the sheet member.

2. The vacuum pressure forming apparatus as claimed in claim 1, wherein each of said cavities of said metal pattern includes at least one air vent hole.

3. The vacuum pressure forming apparatus as claimed in claim 1, wherein said heating device comprises a heating roller, and said endless belt is mounted on said heating roller.

4. The vacuum pressure forming apparatus as claimed in claim 1, further comprising a preheating device for preheating the sheet member prior to the sheet member contacting said endless belt.

5. The vacuum pressure forming apparatus as claimed in claim 1, wherein each of said endless belt air holes has a diameter in the range of approximately 0.2 to 2 mm.

6. The vacuum pressure forming apparatus as claimed in claim 5, wherein the diameter of each of said endless belt air holes is approximately 0.5 mm.

7. An apparatus for forming articles from a sheet of material, said apparatus comprising:

a cooling drum;

a heating drum spaced from said cooling drum;

an endless belt supported on said cooling drum and said heating drum, said endless belt having an inner surface, an outer surface, and a plurality of air holes extending between said inner surface and said outer surface;

a pressing roller, disposed adjacent said heating drum, for pressing the sheet of material into contact with said outer surface of said endless belt at said heating roller;

a pattern device disposed adjacent said outer surface of said endless belt, said pattern device having a plurality of cavities formed therein and being movable toward and away from said endless belt; and a pressurized air supply cover disposed adjacent said inner surface of said endless belt and having a pressurized air inlet, wherein said air cover is positioned directly opposite said pattern device.

8. The apparatus as claimed in claim 7, further comprising a hydraulic cylinder unit connected to said pattern device for moving said pattern device into contact with said endless belt and away from said endless belt.

9. The apparatus as claimed in claim 7, wherein each of said cavities includes at least one air vent hole.

10. The apparatus as claimed in claim 7, further comprising a preheating roller, spaced from said pressing roller, for heating the sheet of material before it is pressed by said pressing roller into contact with said endless belt.

11. The apparatus as claimed in claim 7, further comprising a cooling air supply cover disposed adjacent said pressurized air supply cover.

* * * * *